United States Patent
Chinzei et al.

(10) Patent No.: US 10,501,124 B2
(45) Date of Patent: Dec. 10, 2019

(54) VEHICLE FRONT STRUCTURE AND METHOD FOR MANUFACTURING SAME

(71) Applicant: Kobe Steel, Ltd., Hyogo (JP)

(72) Inventors: Shota Chinzei, Kobe (JP); Junya Naitou, Kobe (JP); Haruyuki Konishi, Kobe (JP); Naoto Takahashi, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 15/764,799

(22) PCT Filed: Sep. 6, 2016

(86) PCT No.: PCT/JP2016/076140
§ 371 (c)(1),
(2) Date: Mar. 29, 2018

(87) PCT Pub. No.: WO2017/056872
PCT Pub. Date: Apr. 6, 2017

(65) Prior Publication Data
US 2018/0273095 A1  Sep. 27, 2018

(30) Foreign Application Priority Data

Oct. 1, 2015 (JP) .................. 2015-195672

(51) Int. Cl.
*B62D 21/11* (2006.01)
*B62D 25/08* (2006.01)
(Continued)

(52) U.S. Cl.
CPC ............ *B62D 21/11* (2013.01); *B62D 25/088* (2013.01); *B62D 27/023* (2013.01);
(Continued)

(58) Field of Classification Search
CPC ....... B62D 25/088; B62D 25/08; B62D 21/11
(Continued)

(56) References Cited

U.S. PATENT DOCUMENTS 5,024,482 A * 6/1991 Isukimi .................... B60G 7/00
  280/124.125
5,102,164 A * 4/1992 Fujinaka .................. B60G 7/02
  180/89.1
(Continued)

FOREIGN PATENT DOCUMENTS

JP   2004306883 A   11/2004
JP   2005-219589 A   8/2005
(Continued)

OTHER PUBLICATIONS

Notification of Transmittal of Translation of the International Preliminary Report on Patentability (Chapter I) and Translation of Written Opinion of the International Searching Authority; PCT/JP2016/076140; dated Apr. 12, 2018.
(Continued)

*Primary Examiner* — Dennis H Pedder
(74) *Attorney, Agent, or Firm* — Studebaker & Brackett PC

(57) ABSTRACT

A vehicle front structure includes a front side member extending in a vehicle front-rear direction in a front portion of a vehicle body, an upper side member disposed above the front side member in a vehicle and extending in the vehicle front-rear direction, and a suspension tower joined to the front side member and the upper side member. The suspension tower is made of aluminum alloy integrally formed by press working. The vehicle front structure is capable of being reduced in weight and being more easily manufactured without introducing new equipment.

13 Claims, 5 Drawing Sheets

(51) Int. Cl.
*B62D 27/02* (2006.01)
*B62D 29/00* (2006.01)
*B62D 65/02* (2006.01)

(52) U.S. Cl.
CPC ......... *B62D 29/007* (2013.01); *B62D 29/008* (2013.01); *B62D 65/02* (2013.01); *B62D 25/08* (2013.01)

(58) Field of Classification Search
USPC ........................................ 296/203.01, 203.02
See application file for complete search history.

(56) References Cited

U.S. PATENT DOCUMENTS

| | | | | |
|---|---|---|---|---|
| 5,674,627 | A * | 10/1997 | Uesugi | B05D 7/51 428/457 |
| 8,109,535 | B2 * | 2/2012 | Barbat | B62D 21/152 180/311 |
| 8,201,873 | B2 * | 6/2012 | Nishimura | B62D 25/04 296/193.06 |
| 2009/0230665 | A1 | 9/2009 | Tamura et al. | |
| 2010/0071434 | A1 * | 3/2010 | Tamai | B21D 22/201 72/347 |
| 2013/0160262 | A1 * | 6/2013 | Furukawa | B21J 15/36 29/243.53 |
| 2013/0248083 | A1 * | 9/2013 | Takahashi | B21J 15/025 156/92 |
| 2019/0134738 | A1 * | 5/2019 | Spinella | B23K 11/3009 |

FOREIGN PATENT DOCUMENTS

| | | |
|---|---|---|
| JP | 2007-309471 A | 11/2007 |
| JP | 2009-220718 A | 10/2009 |
| JP | 2010167949 A | 8/2010 |
| JP | 5011265 B2 | 8/2012 |
| JP | 2013-022622 A | 2/2013 |

OTHER PUBLICATIONS

International Search Report issued in PCT/JP2016/076140; dated Oct. 11, 2016.

* cited by examiner

VEHICLE FRONT STRUCTURE AND METHOD FOR MANUFACTURING SAME

CROSS-REFERENCE TO RELATED APPLICATIONS

This is a national phase application in the United States of International Patent Application No. PCT/JP2016/076140 with an international filing date of Sep. 6, 2016, which claims priority of Japanese Patent Application No. 2015-195672 filed on Oct. 1, 2015 the contents of which are incorporated herein by reference.

TECHNICAL FIELD

The present invention relates to a vehicle front structure and a method for manufacturing the same.

BACKGROUND ART

A vehicle front structure of automobiles includes a suspension tower for supporting a suspension device. In recent years, it has been proposed to form suspension towers of aluminum alloy in order to reduce weight of automobiles. For example, JP 5011265 B discloses a suspension tower (damper housing) made of aluminum alloy integrally formed by casting. Further, JP 5011265 B also discloses a suspension tower made of aluminum alloy formed by separately forming a top plate and a peripheral wall of a suspension tower (damper housing) by press working, and then joining them with rivets or the like.

SUMMARY OT THE INVENTION

Problems to be Solved by the Invention

Since aluminum alloy material has lower ductility than steel material, joining press-formed parts to each other to form a suspension tower can increase a degree of freedom of a shape of the suspension tower. However, as compared with the case where the suspension tower is integrally formed, the number of parts increases, and the number of manufacturing processes increases.

On the other hand, when integrally forming the suspension tower by casting, the degree of freedom of the shape is higher, and the increase in the number of parts can be prevented. However, since casting is not a method, such as press working, commonly used for manufacturing a conventional vehicle structure, sometimes new equipment has to be introduced for casting.

An object of the present invention is to provide a vehicle front structure which can be reduced in weight and more easily manufactured without introducing new equipment, and a manufacturing method thereof.

Means for Solving the Problems

A vehicle front structure according to the present invention characterized in comprising, a front side member disposed in a front portion of a vehicle body and extending in a vehicle front-rear direction, an upper side member disposed above the front side member in a vehicle and extending in the vehicle front-rear direction, and a suspension tower joined to the front side member and the upper side member, the suspension tower made of aluminum alloy integrally formed by press working.

According to this configuration, since the suspension tower is made of aluminum alloy, the weight of the vehicle front structure can be reduced. In addition, since the suspension tower is integrally formed by press working, it is possible to form a suspension tower without introducing new equipment and to simplify the manufacturing process of the vehicle front structure by preventing the increase in the number of parts.

The suspension tower and at least one of the front side member and the upper side member may be joined by a self-piercing rivet driven from the suspension tower.

Since a front side member and an upper side member are framework members of a vehicle body, they are formed of a high strength material such as steel. Therefore, the front side member and the upper side member are formed of a material different from that of the suspension tower made of aluminum alloy. The suspension tower and at least one of the front side member and the upper side member are joined with self-piercing rivets driven from the suspension tower. Thereby, even if the suspension tower and at least one of the front side member and the upper side member are formed of different materials, they can be firmly joined.

In addition, joining them by using self-piercing rivets makes the pilot-hole machining unnecessary. Therefore, the joining process can be simplified as compared with the rivet joining which requires pilot-hole machining, the caulked joining, or the bolt fastening. Therefore, the manufacturing process of the vehicle front structure can be further simplified.

The at least one of the front side member and the upper side member may be made of steel and has a tensile strength of less than 590 MPa.

According to this configuration, at least one of the front side member and the upper side member, into which the self-piercing rivet is driven, can be deformed by the driving of the self-piercing rivet because its tensile strength is less than 590 MPa, and can be firmly joined to the suspension tower.

At least one of the front side member and the upper side member may be made of steel, and may be joined to the suspension tower by being spot-welded to a pierce metal made of steel and embedded in the suspension tower so as to penetrate the suspension tower.

According to this configuration, at least one of the front side member and the upper side member is made of steel, and is formed of a material different from that of the suspension tower made of aluminum alloy. At least one of the front side member and the upper side member is spot-welded to the pierce metal made of steel and embedded in the suspension tower so as to penetrate the suspension tower, thereby joined to the suspension tower. Thereby, even if the suspension tower and at least one of the front side member and the upper side member are formed of different materials, they can be firmly joined.

In addition, since at least one of the front side member and the upper side member is spot-welded to the pierce metal made of steel and embedded in the suspension tower so as to penetrate the suspension tower, at least one of the front side member and the upper side member does not need to be deformed for joining. Therefore, at least one of the front side member and the upper side member can be formed of high strength steel. Thereby, the strength of the vehicle front structure can be increased.

In addition, the pierce metal can be embedded in the suspension tower in a penetrating state by being driven into the suspension tower. Therefore, pilot-hole machining for joining is unnecessary in the suspension tower. Therefore, the joining process can be simplified as compared with the rivet joining which requires pilot-hole machining, the caulked joining, or the bolt fastening. Therefore, the manufacturing process of the vehicle front structure can be further simplified.

The at least one of the front side member and the upper side member may have a tensile strength of 590 MPa or more.

According to this configuration, the strength of the vehicle front structure can be increased.

The suspension tower may be formed of JIS 5000 series aluminum alloy.

JIS 5000 series aluminum alloy is excellent in strength and formability. Therefore, forming the suspension tower of JIS 5000 series aluminum alloy allows the suspension tower to be integrally formed by press working even if the shape of the suspension tower is deep in the pressing direction.

A method for manufacturing a vehicle front structure according to the present invention comprises a press forming step of pressing aluminum alloy material to integrally form a suspension tower, and a joining step of joining the suspension tower to a front side member disposed in a front portion of a vehicle and extending in a vehicle front-rear direction, and to an upper side member disposed above the front side member in a vehicle and extending in the vehicle front-rear direction.

According to this configuration, since the suspension tower is made of aluminum alloy, the weight of the vehicle front structure can be reduced. In addition, since the suspension tower is integrally formed by press working, it is possible to form a suspension tower without introducing new equipment and to simplify the manufacturing process of the vehicle front structure by preventing the increase in the number of parts.

According to the above invention, it is possible to reduce the weight of the vehicle front structure and to manufacture the vehicle front structure more easily without introducing new equipment.

DESCRIPTION OF EMBODIMENTS

First Embodiment

In the following, a first embodiment of the present invention will be described. This embodiment is an example in which a vehicle front structure of the present invention is applied to a vehicle front structure 1 of a sedan-type automobile. It should be noted that an arrow FR, an arrow UP, and an arrow IN, which are shown in each figure as necessary, respectively indicate a vehicle front direction, a vehicle upward direction, and an inner side in a vehicle width direction. Hereinafter, in the case of merely describing by using front and rear, left and right, and up and down directions, unless otherwise noted, it is assumed to indicate front and rear in the vehicle front-rear direction, left and right in the vehicle left-right direction (vehicle width direction), and up and down in the vehicle vertical direction.

Figure 1:
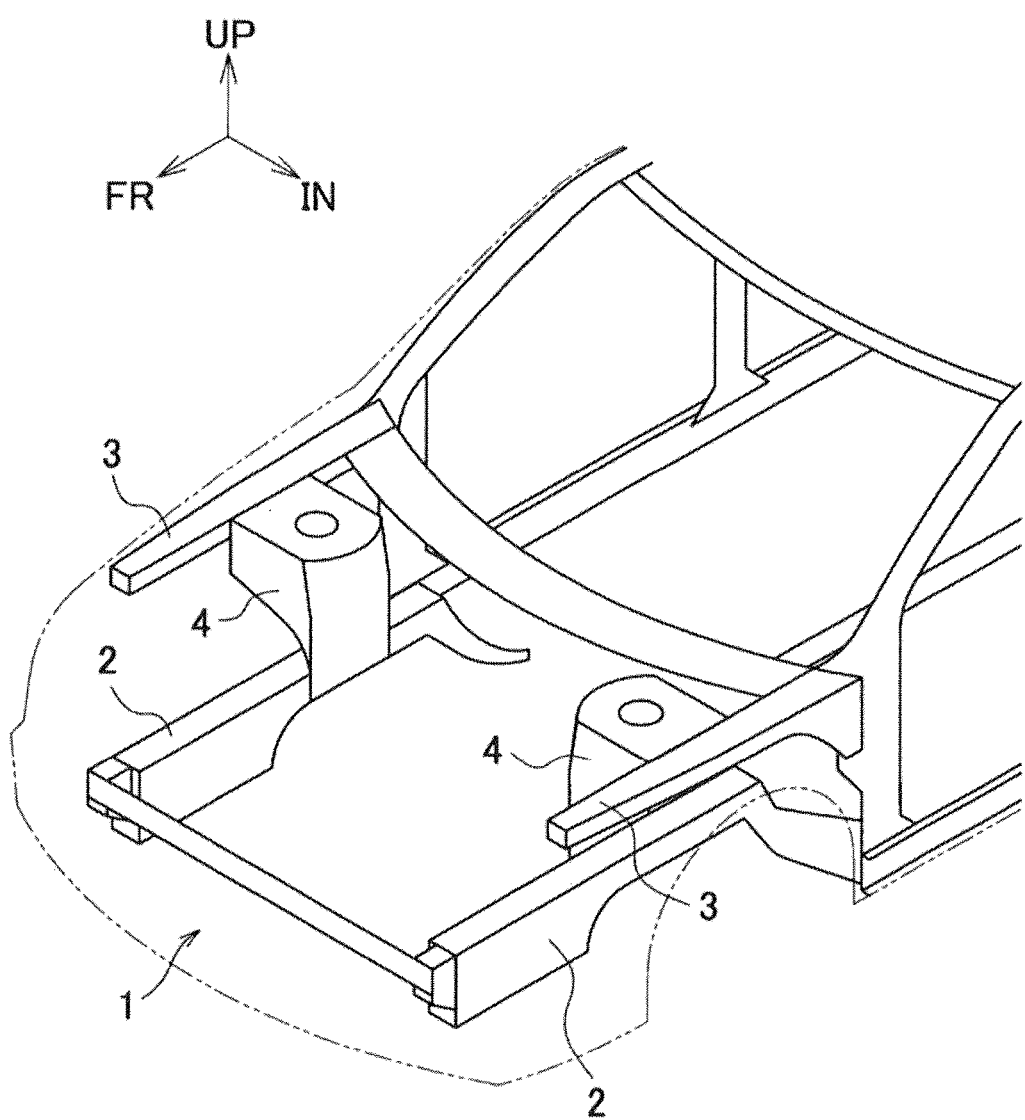
FIG. 1 is a perspective view of a vehicle front structure according to an embodiment.

As shown in FIG. 1, the vehicle front structure 1 includes a front side member 2, an upper side member 3, and a suspension tower 4. The respective front side members 2, upper side members 3, and suspension towers 4 are provided on the left and right sides in a front portion of the vehicle body. The left and right front side members 2 are formed substantially symmetrically. The left and right upper side members 3 are formed substantially symmetrically. The left and right suspension towers 4 are formed substantially symmetrically.

The front side member 2 and the upper side member 3 are framework members of the vehicle body. The front side member 2 extends in the front-rear direction. The upper side member 3 is disposed above the front side member 2 and on an outer side in the vehicle width direction, and extends in the front-rear direction. A front inside panel (not shown) may be joined to the upper side member 3. In addition, the upper side member 3 may be integrated with the front inside panel. The front side member 2 may be formed by the joining of a plurality of members or may be formed with one member. The upper side member 3 may be formed by the joining of a plurality of members or may be formed with one member.

Figure 2:
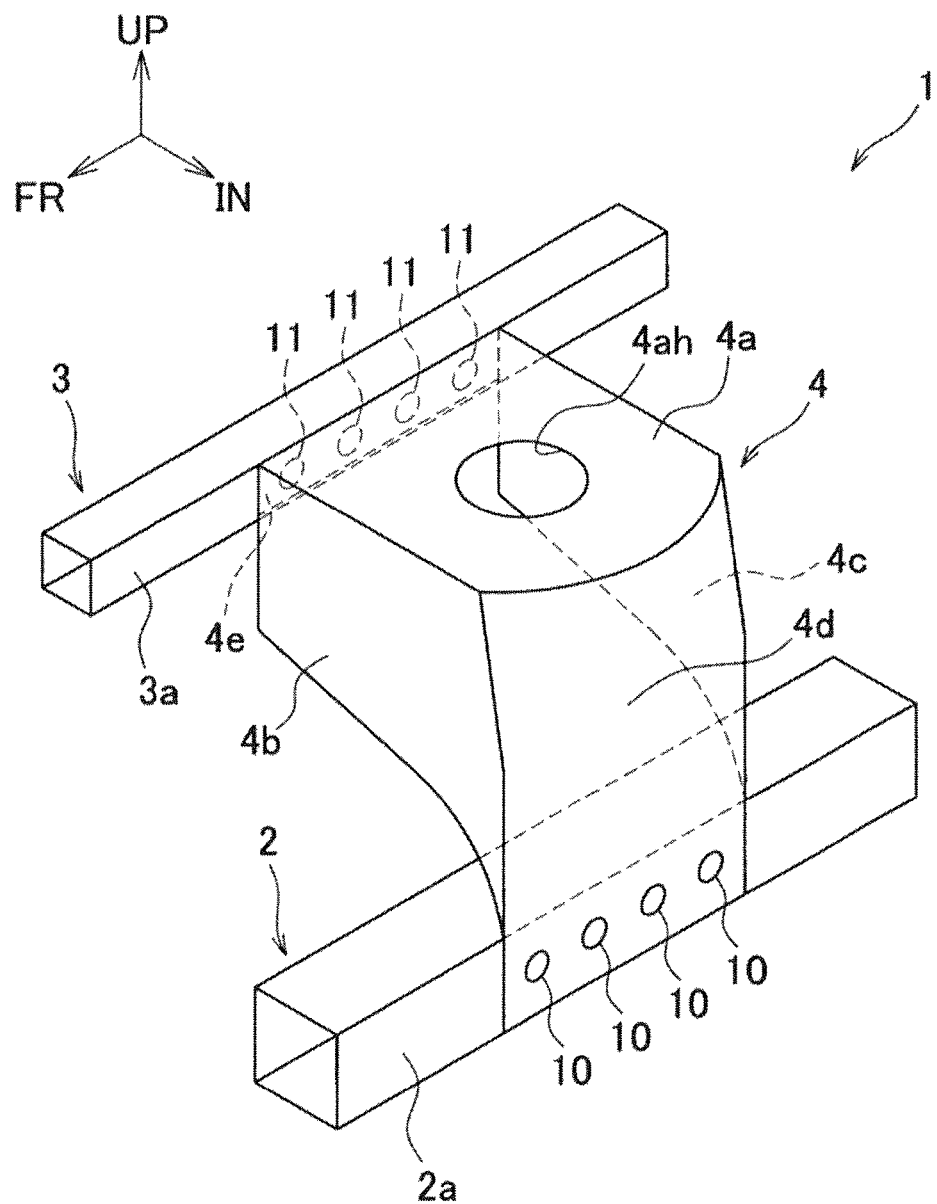
FIG. 2 is a partially enlarged view of the vehicle front structure in FIG. 1.

The suspension tower 4 is bridged over and joined to the front side member 2 and the upper side member 3. As shown in FIG. 2, the front side member 2 and the upper side member 3 are formed such that a cross-sectional shape of at least a portion to be joined to the suspension tower 4 is rectangular. The cross-sectional shape of the portion, joined to the suspension tower 4, of the front side member 2 and the upper side member 3 is not limited to this, and may be, for example, U-shaped. A wall on the inner side in the vehicle width direction of the front side member 2 is defined as a side wall 2a. A wall on the inner side in the vehicle width direction of the upper side member 3 is defined as a side wall 3a. The front side member 2 and the upper side member 3 are made of steel, and their tensile strength is preferably 270 MPa or more.

The suspension tower 4 is disposed so as to cover a suspension device (not shown) and supports the suspension device. As shown in FIG. 2, the suspension tower 4 includes an upper wall 4a, a front wall 4b, a rear wall 4c, a side wall 4d, and a side wall 4e. The front wall 4b and the rear wall 4c respectively extend downward from a front end and a rear end of the upper wall 4a. The side wall 4d extends downward from an end portion on the inner side in the vehicle width direction of the upper wall 4a. The side wall 4e extends downward from an end portion on the outer side in the vehicle width direction of the upper wall 4a. A hole 4ah for attaching a suspension device is formed in the upper wall 4a.

The suspension tower 4 is made of aluminum alloy. The suspension tower 4 is preferably formed of JIS 5000 series aluminum alloy being an Al—Mg based alloy. The JIS 5000 series aluminum alloy contains magnesium and is therefore excellent in strength and formability. It should be noted that the suspension tower 4 may be formed of an aluminum alloy other than the JIS 5000 series aluminum alloy. The suspension tower 4 is integrally formed by press working. In other words, the suspension tower 4 has an integral shape, and is in a state of being pressed. The suspension tower 4 is formed by pressing a hot-rolled steel plate (thick steel plate) having a thickness of about 3 mm, for example. The thickness of the suspension tower 4 is, for example, about 2 to 3 mm.

The side wall 4d of the suspension tower 4 and the side wall 2a of the front side member 2 are joined with a plurality of joint portions 10. The side wall 4e of the suspension tower 4 and the side wall 3a of the upper side member 3 are joined with a plurality of joint portions 11. The plurality of joint portions 10 are joined by self-piercing rivet joining or a joining method using pierce metal (hereinafter referred to as pierce metal welding joining). The plurality of joint portions 11 are joined by self-piercing rivet joining or pierce metal welding joining. The joining methods of the joint portion 10 and the joint portion 11 may be the same or different. When the front side member 2 is made of steel having a tensile strength of 590 MPa or more, the joining method of the joint portion 10 is the pierce metal welding joining. When the front side member 2 is made of steel having a tensile strength of 270 MPa or more and less than 590 MPa, the joining method of the joint portion 10 is preferably the self-piercing rivet joining, but may be the pierce metal welding joining. When the upper side member 3 is made of steel having a tensile strength of 590 MPa or more, the joining method of the joint portion 11 is the pierce metal welding joining. When the upper side member 3 is made of steel having a tensile strength of 270 MPa or more and less than 590 MPa, the joining method of the joint portion 11 is preferably the self-piercing rivet joining, but may be the pierce metal welding joining.

In the following, the case where the joining method of the joint portion 10 for joining the front side member 2 and the suspension tower 4 is self-piercing rivet joining is taken as an example, and the procedure of self-piercing rivet joining will be described. It should be noted that, although description will be omitted, the same procedure also applies to the case where the upper side member 3 and the suspension tower 4 are joined by self-piercing rivet joining.

Figure 3:
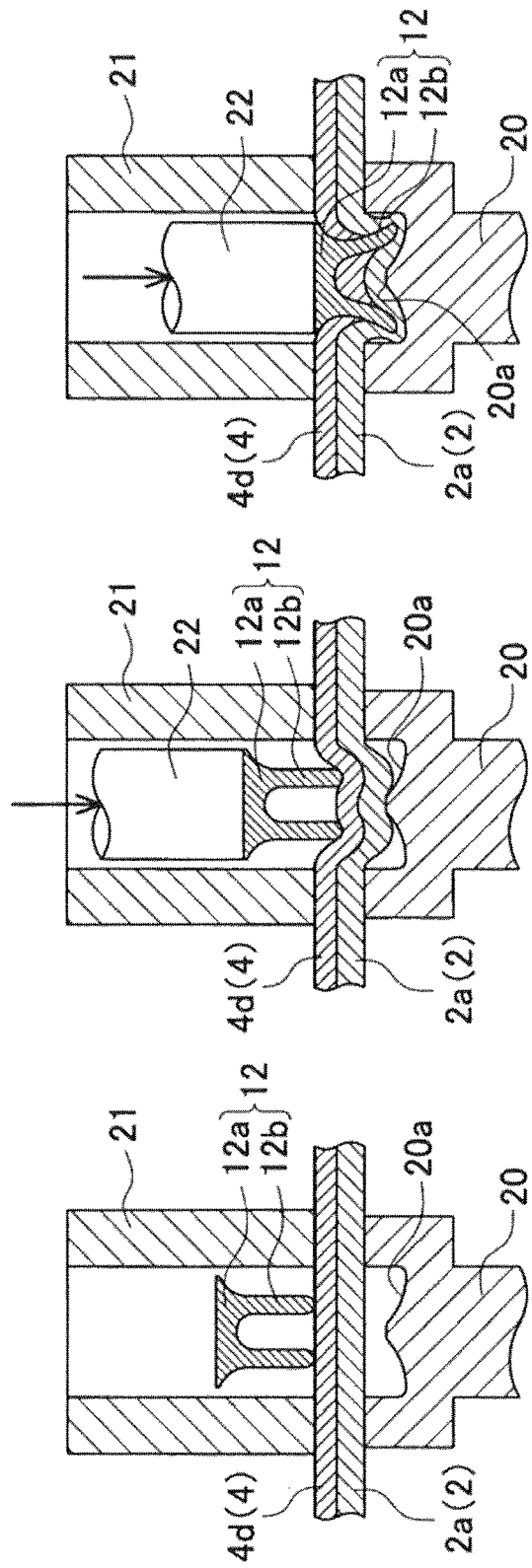
FIGS. 3(a) to 3(c) are diagrams showing the procedure of self-piercing rivet joining.

First, as shown in FIG. 3(a), the side wall 2a of the front side member 2 and the side wall 4d of the suspension tower 4 are overlapped and placed on a die 20. On the upper surface of the die 20, a recess 20a is formed. Subsequently, a tubular guide member 21 is disposed on the side wall 4d of the suspension tower 4, and the side walls 2a and 4d are restricted with the die 20 and the tubular guide member 21. Thereafter, a self-piercing rivet 12 is inserted into the tubular guide member 21. The self-piercing rivet 12 includes a disc-shaped head portion 12a and a cylindrical shaft portion 12b. In FIG. 3(a), the diameter of the head portion 12a is larger than the outer diameter of the shaft portion 12b, but may be the same as the outer diameter of the shaft portion 12b. A material of the self-piercing rivet 12 is, for example, steel, but it is not limited thereto.

Next, as shown in FIG. 3(b), the head portion 12a of the self-piercing rivet 12 is pressed with a punch 22 and the self-piercing rivet 12 is driven from the side wall 4d of the suspension tower 4 into the side walls 2a and 4d. It should be noted that the driving of the self-piercing rivet 12 can be performed by using a general-purpose press machine. As the driving operation progresses, the side walls 2a and 4d are plastically deformed so as to bulge toward the recess 20a side of the die 20. As the driving operation further progresses, the shaft portion 12b of the self-piercing rivet 12 starts spreading from a tip end side. In addition, the shaft portion 12b of the self-piercing rivet 12 cuts into the side wall 4d of the suspension tower 4.

Then, finally, as shown in FIG. 3(c), the self-piercing rivet 12 penetrates the side wall 4d of the suspension tower 4, but does not penetrate the side wall 2a of the front side member 2, and the joining is completed in a state where the head portion 12a of the self-piercing rivet 12 is almost flush with the side wall 4d. The shaft portion 12b of the self-piercing rivet 12 spreads and cuts into the side walls 2a and 4d, thereby being firmly fixed to the side walls 2a and 4d due to caulking effect. Through the above processes, the side wall 4d of the suspension tower 4 and the side wall 2a of the front side member 2 are joined.

Next, the case where the joining method of the joint portion 10 for joining the front side member 2 and the suspension tower 4 is pierce metal welding joining is taken as an example, and the procedure of pierce metal welding joining will be described. It should be noted that the same procedure also applies to the case where the upper side member 3 and the suspension tower 4 are joined by pierce metal welding joining. A more detailed procedure of the pierce metal welding joining may be the same as the procedure disclosed in JP 5629244 B, for example.

Figure 4:
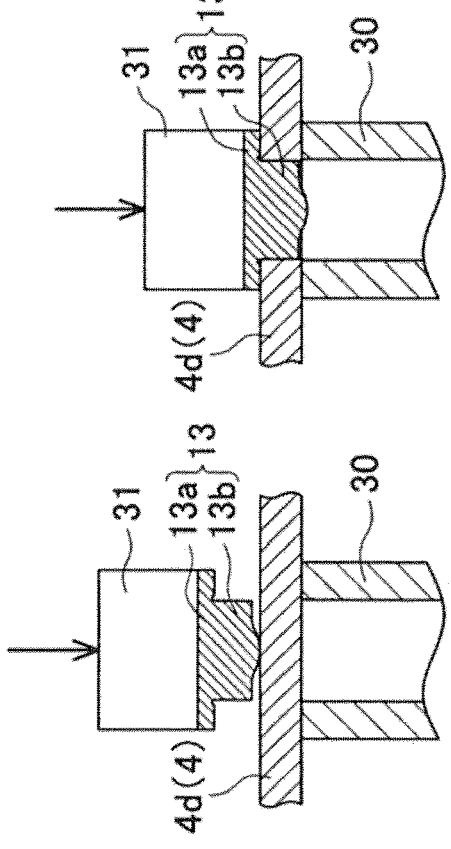
FIGS. 4(a) to 4(d) are diagrams showing the procedure of pierce metal welding joining.

As shown in FIG. 4(a), a pierce metal 13 used in the pierce metal welding joining includes a disc-shaped head portion 13a and a cylindrical shaft portion 13b. The diameter of the head portion 13a is larger than the diameter of the shaft portion 13b. In the present embodiment, the tip of the pierce metal 13 has a shape in which the central portion protrudes, but the shape of the tip of the shaft portion 13b of the pierce metal 13 is not limited to this. The length of the shaft portion 13b of the pierce metal 13 is set to be not less than the thickness of the side wall 4d of the suspension tower 4. The pierce metal 13 is made of a material that can be welded to an object (front side member 2 in this case) to be joined to the suspension tower 4. The pierce metal 13 is preferably made of steel.

As shown in FIG. 4(a), the side wall 4d of the suspension tower 4 is placed on a cylindrical die 30. Then, the head portion 13a of the pierce metal 13 is pressed with a punch 31, and the pierce metal 13 is driven into the side wall 4d. Thus, as shown in FIG. 4(b), a portion corresponding to the shaft portion 13b of the pierce metal 13 is punched out in the side wall 4d, and the pierce metal 13 is embedded (fitted) in a state of penetrating the side wall 4d. It should be noted that the driving of the pierce metal 13 can be performed by using a general-purpose press machine.

Next, as shown in FIG. 4(c), the side wall 4d of the suspension tower 4 and the side wall 2a of the front side member 2 are overlapped so that the shaft portion 13b of the pierce metal 13 makes contact with the side wall 2a of the front side member 2. Then, the side wall 2a and the pierce metal 13 are sandwiched between a pair of spot electrodes 32 and 33, and a current is passed through the pair of spot electrodes 32 and 33 to perform spot welding. Thus, as shown in FIG. 4(d), the pierce metal 13 and a portion in contact with the pierce metal 13 of the side wall 2a are melted, and the shaft portion 13b of the pierce metal 13 and the side wall 2a are welded. Through the above processes, the side wall 4d of the suspension tower 4 and the side wall 2a of the front side member 2 are joined.

In the method for manufacturing the vehicle front structure 1, first, a press forming process of pressing the aluminum alloy material and integrally forming the suspension tower 4 is performed. Thereafter, the above joining process by self-piercing rivet joining or pierce metal joining is performed.

The vehicle front structure 1 of the present embodiment has the following features.

Since the suspension tower 4 is made of aluminum alloy, the weight of the vehicle front structure 1 can be reduced. In addition, since the suspension tower 4 is integrally formed by press working, it is possible to form a suspension tower 4 without introducing new equipment and to simplify the manufacturing process of the vehicle front structure 1 by preventing the increase in the number of parts.

The front side member 2 and the upper side member 3 are formed of steel, and are formed of a material different from that of the suspension tower 4 made of aluminum alloy. It is difficult to weld aluminum and iron. In general, mechanical joining is used for joining of different materials. Mechanical joining includes rivet joining requiring pilot-hole machining, caulking joining, bolt fastening, and the like.

When the suspension tower 4 and at least one of the front side member 2 and the upper side member 3 are joined by self-piercing rivet joining, they can be firmly joined even if the suspension tower 4 and at least one of the front side member 2 and the upper side member 3 are formed of different materials.

In addition, in the case of joining the suspension tower 4 and at least one of the front side member 2 and the upper side member 3 by using the self-piercing rivet 12, pilot-hole machining is unnecessary. Therefore, the joining process can be simplified as compared with the rivet joining which requires pilot-hole machining, the caulked joining, or the bolt fastening. Therefore, the manufacturing process of the vehicle front structure 1 can be further simplified.

Since the front side member 2 and/or the upper side member 3 to be joined by self-piercing rivet joining to the suspension tower 4 has a tensile strength of less than 590 MPa, the front side member 2 and/or the upper side member 3 can be deformed by the driving of the self-piercing rivet, to be firmly joined to the suspension tower 4.

In addition, when the suspension tower 4 and at least one of the front side member 2 and the upper side member 3 are joined by pierce metal welding joining, they can be firmly joined even if the suspension tower 4 and at least one of the front side member 2 and the upper side member 3 are formed of different materials.

In addition, the pierce metal 13 can be embedded in the suspension tower 4 in a penetrating state by being driven into the suspension tower 4. Therefore, when the suspension tower 4 and at least one of the front side member 2 and the upper side member 3 are joined by using the pierce metal 13, it is not necessary for the suspension tower 4 to perform pilot-hole machining for joining. Therefore, the joining process can be simplified as compared with the rivet joining which requires pilot-hole machining, the caulked joining, or the bolt fastening. Therefore, the manufacturing process of the vehicle front structure 1 can be further simplified.

In the case of joining the suspension tower 4 and the front side member 2 and/or the upper side member 3 by self-piercing rivet joining, other rivet joining, or caulking joining, it is necessary to pressurize and deform the front side member 2 and/or the upper side member 3. Therefore, the strength of the front side member 2 and/or the upper side member 3 must be kept within a range of strength that can be deformed.

On the other hand, in the case of joining the suspension tower 4 and the front side member 2 and/or the upper side member 3 by pierce metal welding joining, the front side member 2 and/or the upper side member 3 is spot-welded to the steel pierced metal 13 embedded in the suspension tower 4, so that there is no need to deform the front side member 2 and/or the upper side member 3 for joining. Therefore, the front side member 2 and/or the upper side member 3 to be joined to the suspension tower 4 by pierce metal welding joining can be formed of high strength steel. Thereby, the strength of the vehicle front structure 1 can be increased.

When the tensile strength of the front side member 2 and/or the upper side member 3 to be joined to the suspension tower 4 by pierce metal welding joining is 590 MPa or more, the strength of the vehicle front structure 1 can be further increased.

JIS 5000 series aluminum alloy is excellent in strength and formability. Therefore, forming the suspension tower of JIS 5000 series aluminum alloy allows the suspension tower to be integrally formed by press working even if the shape of the suspension tower 4 is deep in the pressing direction.

Although the embodiment of the present invention has been described above, the specific configuration of the present invention is not limited to the above embodiment. The scope of the present invention is indicated not only by the description of the embodiment but also by the scope of the claims, and furthermore, includes the meaning equivalent to the claims and all changes within the scope.

Figure 5:
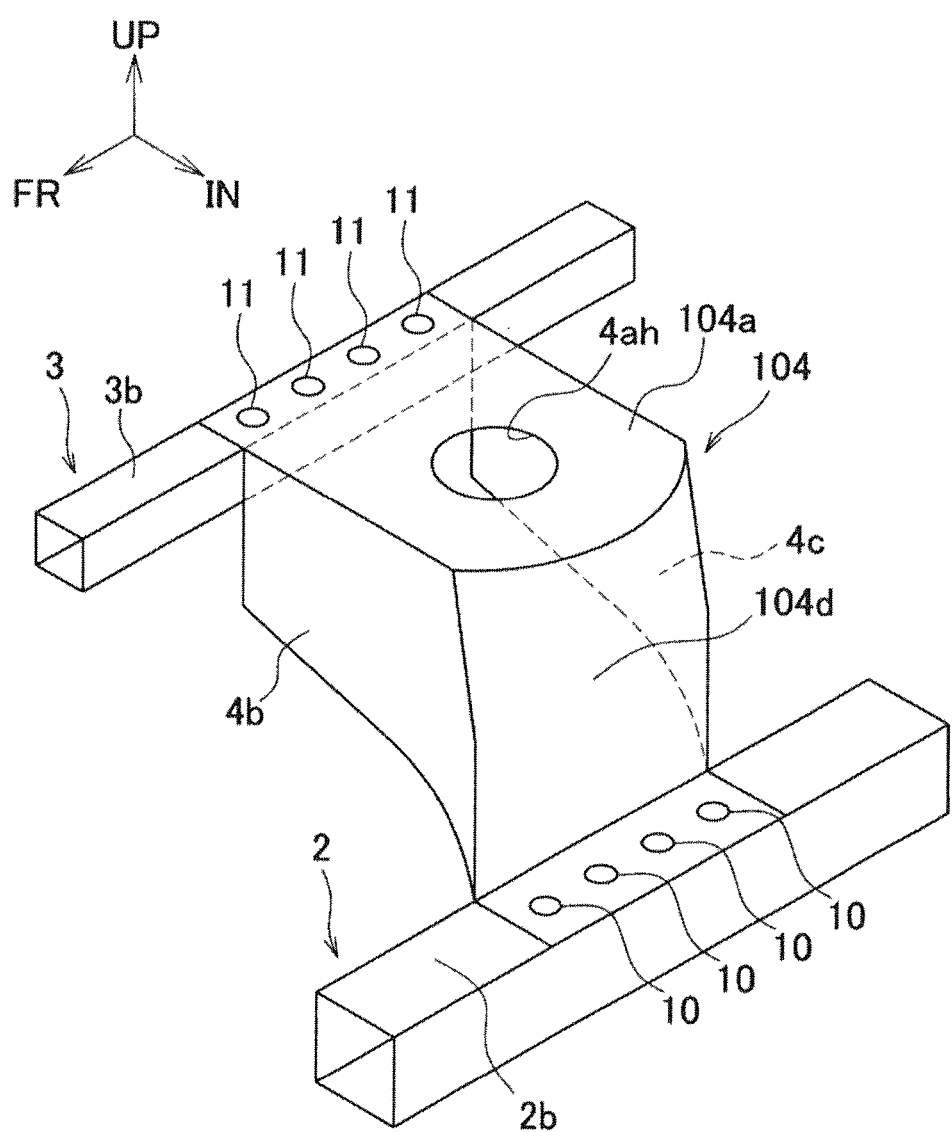
FIG. 5 is a partially enlarged perspective view of a vehicle front structure according to a modified example.

In the above embodiment, the suspension tower 4 and the front side member 2 are joined in the side wall 4*d* of the suspension tower 4 and the side wall 2*a* of the front side member 2, but the joint portion is not limited to these. For example, as shown in FIG. 5, a side wall 104*d* of a suspension tower 104 and an upper wall 2*b* of the front side member 2 may be joined.

In the above embodiment, the suspension tower 4 and the upper side member 3 are joined in the side wall 4*e* of the suspension tower 4 and the side wall 3*a* of the upper side member 3, but the joint portion is not limited to these. For example, as shown in FIG. 5, an upper wall 104*a* of the suspension tower 104 and an upper wall 3*b* of the upper side member 3 may be joined.

In the above embodiment, the joining method of the joint portion 10 for joining the suspension tower 4 and the front side member 2 is self-piercing rivet joining or pierce metal welding joining, but other joining methods may be used. The joining method of the joint portion 11 for joining the suspension tower 4 and the upper side member 3 is self-piercing rivet joining or pierce metal welding joining, but other joining methods may be used.

The invention claimed is:

1. A vehicle front structure comprising:
    a front side member disposed in a front portion of a vehicle body and extending in a vehicle front-rear direction;
    an upper side member disposed above the front side member in a vehicle and extending in the vehicle front-rear direction; and
    a suspension tower formed by an upper wall, a front wall extending downward from a front end of the upper wall, a rear wall extending downward from a rear end of the upper wall, an external side wall extending downward from one side end of the upper wall, and an inner side wall extending downward from the other side end of the upper wall;
    wherein
    the suspension tower is joined to the front side member and the upper side member in such a manner that only the external side wall is connected to the upper side member and only the inner side wall is connected to the front side member; and
    the suspension tower is made of aluminum alloy integrally formed by press working.

2. The vehicle front structure according to claim 1, wherein the suspension tower and at least one of the front side member and the upper side member are joined by a self-piercing rivet driven from the suspension tower.

3. The vehicle front structure according to claim 2, wherein the at least one of the front side member and the upper side member is made of steel and has a tensile strength of less than 590 MPa.

4. The vehicle front structure according to claim 1, wherein at least one of the front side member and the upper side member is made of steel, and is joined to the suspension tower by being spot-welded to a pierce metal made of steel and embedded in the suspension tower so as to penetrate the suspension tower.

5. The vehicle front structure according to claim 4, wherein the at least one of the front side member and the upper side member has a tensile strength of 590 MPa or more.

6. The vehicle front structure according to claim 1, wherein the suspension tower is formed of JIS 5000 series aluminum alloy.

7. A method for manufacturing a vehicle front structure, comprising:
   a press forming step of pressing aluminum alloy material to integrally form a suspension tower having an upper wall, a front wall extending downward from a front end of the upper wall, a rear wall extending downward from a rear end of the upper wall, an external side wall extending downward from one side end of the upper wall, and an inner side wall extending downward from the other side end of the upper wall; and
   a joining step of joining the suspension tower to a front side member disposed in a front portion of a vehicle and extending in a vehicle front-rear direction, and to an upper side member disposed above the front side member in a vehicle and extending in the vehicle front-rear direction in such a manner that only the external side wall is connected to the upper side member and only the inner side wall is connected to the front side member.

8. The vehicle front structure according to claim 2, wherein the suspension tower is formed of JIS 5000 series aluminum alloy.

9. The vehicle front structure according to claim 3, wherein the suspension tower is formed of JIS 5000 series aluminum alloy.

10. The vehicle front structure according to claim 4, wherein the suspension tower is formed of JIS 5000 series aluminum alloy.

11. The vehicle front structure according to claim 5, wherein the suspension tower is formed of JIS 5000 series aluminum alloy.

12. A method for manufacturing a vehicle front structure, comprising:
   a press forming step of pressing aluminum alloy material to integrally form a suspension tower having an upper wall, a front wall extending downward from a front end of the upper wall, a rear wall extending downward from a rear end of the upper wall, an inner side wall extending downward from an inner side end of the upper wall,
   wherein a lower end portion of the side wall extends internally to form a joint portion; and
   a joining step of joining the suspension tower to a front side member disposed in a front portion of a vehicle and extending in a vehicle front-rear direction, and to an upper side member disposed above the front side member in a vehicle and extending in the vehicle front-rear direction in such a manner that only an external side portion of the upper wall is connected to the upper side member and only the joint portion of the side wall is connected to the front side member.

13. The vehicle front structure according to claim 1, wherein a dimension of the external side wall in the vehicle front-rear direction is substantially the same as a dimension of the upper wall in the vehicle front-rear direction, and a dimension of the inner side wall in the vehicle front-rear direction is substantially the same as a dimension of the upper wall in the vehicle front-rear direction.

* * * * *